Sept. 23, 1958  C. A. CAYA  2,852,981
SWINGAWAY SUPPORT FOR MISSILES
Filed July 1, 1953  2 Sheets-Sheet 1

INVENTOR.
CARL A. CAYA
BY
ATTORNEYS

Sept. 23, 1958    C. A. CAYA    2,852,981
SWINGAWAY SUPPORT FOR MISSILES
Filed July 1, 1953    2 Sheets-Sheet 2
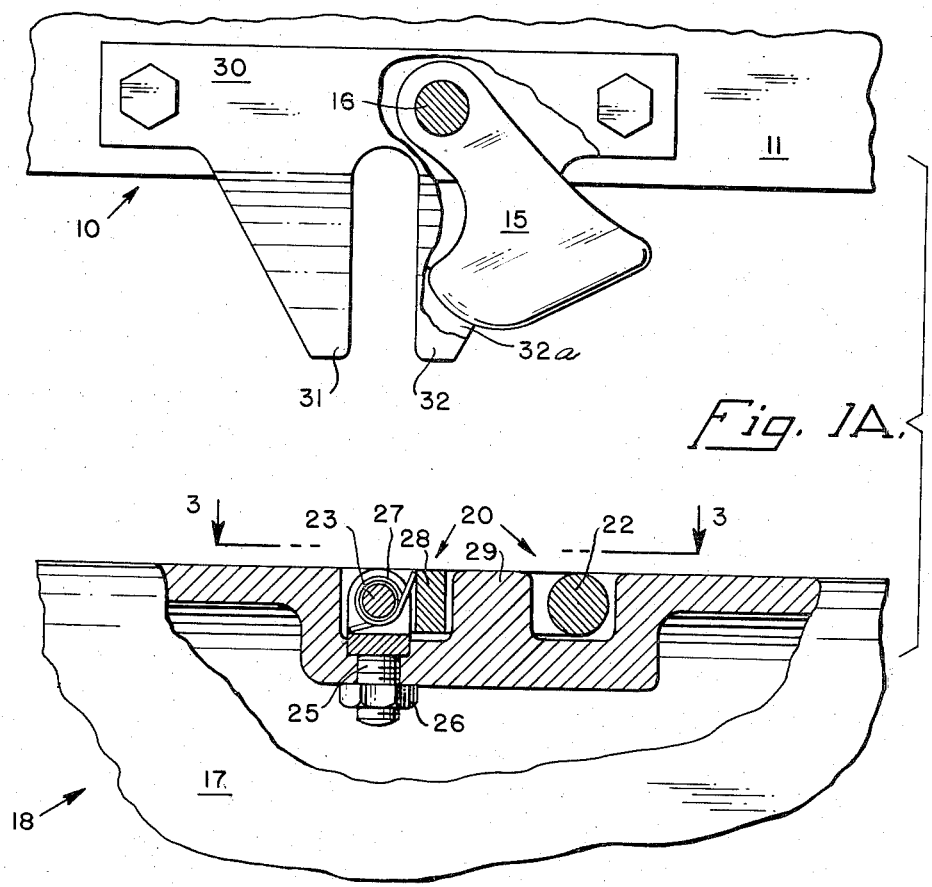
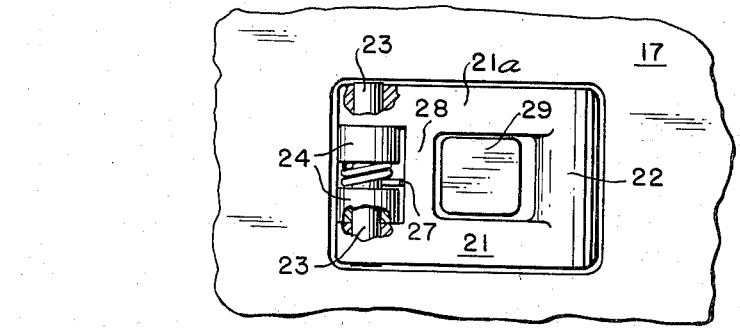
INVENTOR.
CARL A. CAYA
BY
ATTORNEYS

United States Patent Office 2,852,981
Patented Sept. 23, 1958

2,852,981

SWINGAWAY SUPPORT FOR MISSILES

Carl A. Caya, Los Angeles, Calif.

Application July 1, 1953, Serial No. 365,566

2 Claims. (Cl. 89—1.5)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in apparatus for suspending missiles, such as torpedoes, from aircraft and for launching same therefrom.

It is highly desirable that a torpedo be devoid of suspension protuberances which produce drag or noise when the torpedo is moving through the water, and to attain this end, it has been common practice to suspend torpedos from aircraft with surrounding bands which break away from the torpedo after it has been launched from an aircraft, thus leaving the torpedo with a smooth hydrodynamic exterior surface. Bands of this type are complicated and require techniques to properly apply them to a torpedo and aircraft when the former is being positioned for suspension by the latter.

An object of this invention is to provide suspension apparatus for a torpedo which protrudes therefrom while the torpedo is being carried by an aircraft but folds into the torpedo shell in non-protruding manner after the torpedo is launched and during its movement through water.

Another object is to cooperatively associate the suspension apparatus with a conventional aircraft bomb rack and attachment means for same in such manner to preclude relative longitudinal movement between the aircraft and torpedo.

Other objects, advantages and salient features will become more apparent from a consideration of the description to follow, the appended claims, and the accompanying drawing, in which:

Fig. 1A illustrates the parts shown in Fig. 1 after the torpedo has been launched by the aircraft;

Fig. 3 is a top plan of the torpedo as viewed from plane 3—3, Fig. 2.

Figure 1:
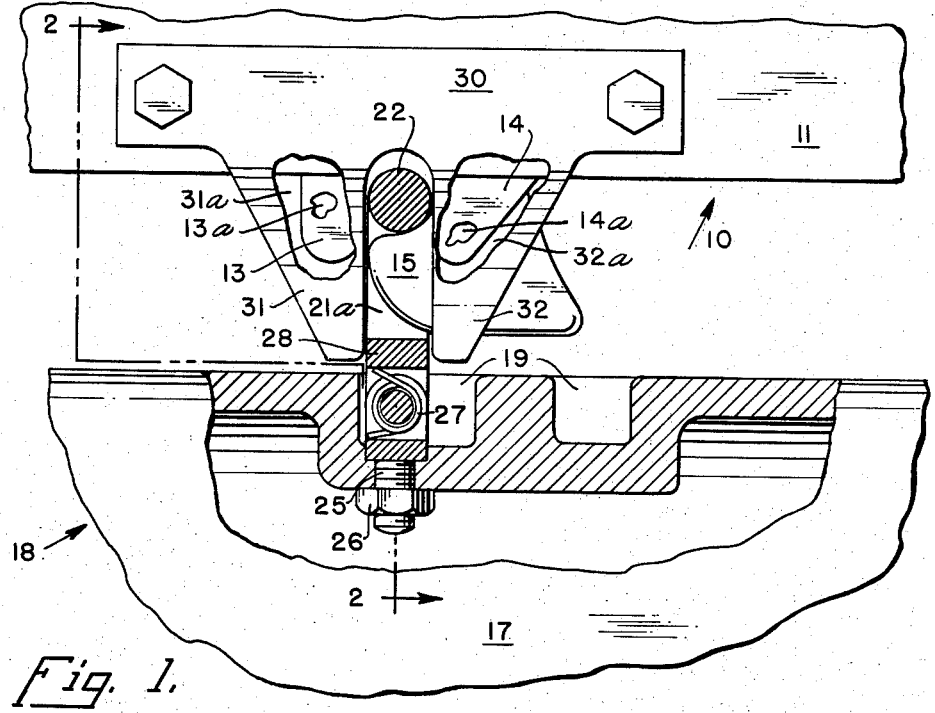
Fig. 1 is a fragmentary side elevation of a torpedo suspended by a bomb rack, portions being broken away.
Figure 2:
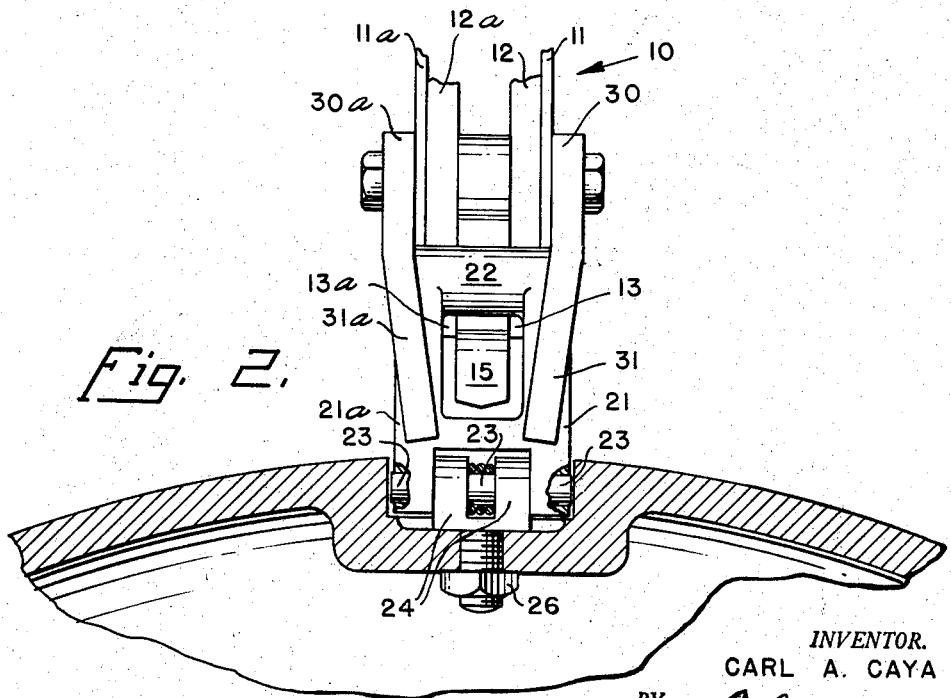
Fig. 2 is a section taken on line 2—2, Fig. 1; portions being broken away.

Referring in detail to the drawing, bomb rack 10 is of conventional construction, comprising a pair of elongated spaced parallel plate-like members 11, 11a adapted to be affixed to an aircraft and to the confronting surfaces of which are affixed, respectively, a pair of plate-like members 12, 12a. Member 12 is provided with a pair of longitudinally spaced downwardly directed projections 13, 14, and member 12a, which is identical to member 12, is provided with transversely aligned projections 13a, 14a. A hook 15, carried by a pivot pin 16, is displaced between members 12, 12a and is adapted to swing between the positions shown in Fig. 1 and Fig. 1A. A second pair of plates and a second hook, identical to plates 12, 12a and hook 15, respectively (not shown), are similarly carried by members 11, 11a in longitudinally spaced relation to the construction illustrated. In the normal use of the bomb rack so far described, the hooks engage the bight portions of a pair of spaced support rings which protrude from a bomb. These rings are rigidly and immovably affixed to the bomb and it will be apparent that the two point support, by the spaced hooks, and the arrangement of bights of the rings between the various projections, such as 13, 14, precludes any relative longitudinal movement between the bomb and the bomb rack due to acceleration forces.

The shell 17 of a torpedo 18 is provided with a recess 19 in its outer surface into which may fold, as best shown in Figs. 1A and 3, a torpedo support member 20. Member 20 comprises a pair of spaced legs 21, 21a joined at their outer ends by a bight portion 22, this construction being generally similar to the bight portion and legs of a bomb support ring previously referred to. Member 20 differs from the bomb support, however, in that its legs 21, 21a are pivotally connected to the shell by a pivot pin 23 which extends through the legs and through a member 24 affixed to the shell by a shank 25 and nut 26. The portion of member 24, disposed within recess 19, is bifurcated providing a space for a torsion spring 27 which surrounds pin 23, one of its ends engaging member 24 and its other end engaging a tie member 28 extending between legs 21, 21a. A land portion 29 substantially fills the space between bight 22, legs 21, 21a and tie portion 28, so that when member 20 is in folded position, as shown in Figs. 1A and 3, the torpedo shell is hydrodynamically smooth.

In the construction so far described, it will be apparent that when the bight portions of the two longitudinally spaced support members 20 are suspended by their respective carrying hooks 15, the torpedo is free to move in a longitudinal direction relative to the bomb rack in response to acceleration forces, which, of course, is undesirable. To obviate their movement, the conventional bomb rack is modified by attaching thereto a pair of plate-like members 30, 30a having, respectively, spaced depending fingers 31, 32 and 31a, 32a which engage, respectively, front and rear surfaces of legs 21, 21a of member 20. Since these fingers prevent rotation of bight 22 on hook 15, it will be apparent that the torpedo is restrained against longitudinal movement relative to the bomb rack.

Obviously many modifications and variations of the present invention are possible in the light of the above teachings. It is therefore to be understood that within the scope of the appended claims the invention may be practiced otherwise than as specifically described.

What is claimed is:

1. Missile suspension apparatus comprising, in combination; an aircraft bomb rack of the type having a pair of elongated spaced parallel support members having transversely aligned downwardly open slots forming a downwardly open space therebetween, a hook adapted to swing between said members and across said space between a missile holding position and a missile release position, a U-shaped missile suspension member having an upper bight portion adapted to lie on the top of said hook when the latter is disposed in said missile holding position, and a pair of downwardly extending leg portions, the lower ends of which are pivotally connected to a missile to permit the suspension member to swing from an upwardly extending position relative to the missile to a folded position within the confines of the missile after the missile is released from the hook, and means for restraining the missile against longitudinal movement relative to the bomb rack comprising at least one attachment member rigidly secured to the bomb rack having a downwardly open notch to receive one of said leg portions and prevent it from swinging about a transverse axis of the suspension member.

2. Apparatus in accordance with claim 1 including resilient means for urging the suspension member toward its folded position.

References Cited in the file of this patent

UNITED STATES PATENTS

| | | |
|---|---|---|
| 2,435,639 | Stockton | Feb. 10, 1948 |
| 2,451,481 | Elder et al. | Oct. 19, 1948 |
| 2,461,406 | Birk et al. | Feb. 8, 1949 |
| 2,532,743 | Storch | Dec. 5, 1950 |
| 2,591,834 | Kuka | Apr. 8, 1952 |
| 2,630,741 | Robert et al. | Mar. 10, 1953 |

FOREIGN PATENTS

| | | |
|---|---|---|
| 236,575 | Great Britain | Dec. 17, 1925 |
| 42,064 | Netherlands | Nov. 15, 1937 |